United States Patent [19]
Connolly et al.

[11] Patent Number: 4,869,977
[45] Date of Patent: * Sep. 26, 1989

[54] ELECTROLYTE ADDITIVE FOR LITHIUM-SULFUR DIOXIDE ELECTROCHEMICAL CELL

[75] Inventors: John F. Connolly, Glen Ellyn; Robert J. Thrash, St. Charles; Bruce D. Webber, Naperville, all of Ill.

[73] Assignee: Amoco Corporation, Chicago, Ill.

[*] Notice: The portion of the term of this patent subsequent to Jun. 21, 2005 has been disclaimed.

[21] Appl. No.: 186,063

[22] Filed: Apr. 25, 1988

[51] Int. Cl.$^4$ .............................................. H01M 10/36
[52] U.S. Cl. .................... 429/101; 429/196; 429/105
[58] Field of Search ................... 429/101, 196, 50, 105

[56] References Cited

U.S. PATENT DOCUMENTS

| 4,020,240 | 4/1977 | Schlaikjer | 429/196 |
| 4,071,664 | 1/1978 | Dey | 429/194 |
| 4,139,680 | 2/1979 | Schlaikjer | 429/196 |
| 4,331,743 | 5/1982 | Dey et al. | 429/196 |
| 4,409,303 | 10/1983 | Bowden | 429/196 |
| 4,440,836 | 4/1984 | Bailey | 429/196 |
| 4,752,541 | 6/1988 | Faulkner et al. | 429/101 |

OTHER PUBLICATIONS

Bredmeyer et al., Z. Anorg. Allg. Chem., 515, pp. 187–198, 1984.

Primary Examiner—Donald L. Walton
Attorney, Agent, or Firm—Richard A. Kretchmer; William H. Magidson; Ralph C. Medhurst

[57] ABSTRACT

The degradation of organic electrode separators in rechargeable lithium-sulfur dioxide electrochemical cells which utilize chemically uncombined aluminum chloride as an electrolyte component can be reduced by incorporating an additive into the electrolyte which is effective to provide a redox couple having a potential in the range which is above that of the $SO_2/S_2O_4^{-2}$ couple and below that of the $Cl_2/Cl^-$ couple.

15 Claims, No Drawings

ELECTROLYTE ADDITIVE FOR LITHIUM-SULFUR DIOXIDE ELECTROCHEMICAL CELL

FIELD OF THE INVENTION

This invention relates to an improved lithium-sulfur dioxide electrochemical cell which utilizes chemically uncombined aluminum chloride as an electrolyte component. More particularly, it relates to the use of an electrolyte additive for such a cell which is effective to provide a redox couple in the electrolyte having a potential in the range which is above that of the $SO_2/S_2O_4^{-2}$ couple and below that of the $Cl_2/Cl^-$ couple.

BACKGROUND OF THE INVENTION

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals with reduction potentials which are more negative than that of hydrogen in the electromotive series of elements in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watthours per kilogram of all known active metals.

In conventional electrochemical cells, cathode depolarizers are used in a form which will permit an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as a nickel or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell.

U.S. Pat. No. 4,020,240, issued to Schlaikjer on Apr. 26, 1977, is directed to the use of clovoborate salts in an electrochemical cell which contains an active metal anode. Such salts contain an anion of the general formula $(B_mX_n)^{-k}$ where m, n and k are integers, B is boron and X is preferably selected from the group consisting of F, Cl, Br and I. It is further disclosed that sulfur dioxide is a suitable electrolyte solvent and cathode depolarizer for such a cell and that $Li_2B_{10}Cl_{10}$ is a suitable clovoborate salt. Similarly, U.S. Pat. No. 4,139,680, issued to Schlaikjer on Feb. 13, 1979, discloses that the above-mentioned clovoborate salts can be used as an electrolyte additive to prevent dendrite formation in alkali and alkaline earth metal nonaqueous secondary cells.

West German Offenlegungsschrift No. 2,140,146 discloses a nonaqueous electrochemical cell which contains an alkali metal anode, a strong oxidizing agent which undergoes reduction at the cathode and an electrolyte which is composed of a mixture of an alkali metal halide, an aluminum halide and sulfur dioxide. Chlorine, an interhalogen compound or an anhydrous salt such as copper (II) chloride is used as the oxidizing agent in this cell.

Copending U.S. Pat. Application Ser. No. 23,777, filed Mar. 9, 1987, now U.S. Pat. No. 4,752,541 discloses the use of aluminum chloride as an electrolyte component for lithium-sulfur dioxide electrochemical cells to improve discharge capacity and cycling characteristics. This copending application also discloses that a preferred electrolyte comprises a solution of aluminum chloride and at least one lithium salt in a mixture of liquid sulfur dioxide with at least one organic compound.

Rechargeable lithium-sulfur dioxide electrochemical cells are conventionally constructed using an electrode pack wherein alternating anode and cathode layers are separated from each other by an inert porous electrode separator. For example, the electrode pack can be prepared by sandwiching a porous electrode separator between a lithium foil anode and a sheet of flexible carbon as the cathode current collector and rolling the resulting sandwich structure into a roll. Electrode separators are conventionally fabricated from organic polymers such as polyethylene, polypropylene, polyvinyl chloride, nylon and copolymers of ethylene and tetrafluoroethylene.

We have found that conventional organic electrode separators undergo relatively rapid decomposition and failure when utilized in a rechargeable lithium-sulfur dioxide electrochemical cell which comprises aluminum chloride as an electrolyte component. This decomposition of the electrode separator is observed after a relatively small number of charge-discharge cycles and results in cell failure, apparently as a consequence of internal short circuits which are formed during recharge by lithium metal penetrating the decomposed separator material.

SUMMARY OF THE INVENTION

The present invention is directed to the discovery that an aluminum chloride containing electrolyte for a rechargeable lithium-sulfur dioxide electrochemical cell can be modified by an additive to render it more compatible with conventional organic electrode separators. More particularly, it has been found that incorporation into the electrolyte of an additive which is effective to provide a redox couple having a potential in the range which is above that of the $SO_2/S_2O_4^{-2}$ couple and below that of the $Cl_2/Cl^-$ couple serves to improve the electrolyte's compatibility with conventional organic electrode separators. This improved compatibility results in a substantial increase in the number of charge-discharge cycles that the cell will undergo, which is herein referred to as an improved cycle-life.

In addition, we have found that the additive also serves to improve the efficiency with which the electrochemical cell of this invention can be recharged. This improved efficiency is independent of any effect with respect to improved electrode separator stability and can be observed as an improved cycle-life at charge voltages which are lower than those that cause significant separator degradation in the absence of the additive.

One embodiment of the invention is a nonaqueous conductive liquid which comprises a solution in liquid sulfur dioxide of: (a) at least one polar organic compound; (b) aluminum chloride; (c) at least one lithium salt; and (d) at least one additive which is effective to provide a redox couple in said solution having a potential in the range which is above that of the $SO_2/S_2O_4^{-2}$ couple and below that of the $Cl_2/Cl^-$ couple, wherein said polar organic compound and lithium salt do not provide a redox couple having a potential in said range.

Another embodiment of the invention is, in a rechargeable electrochemical cell containing: (a) an anode which is comprised of lithium; (b) a cathode; (c) an organic separator between said cathode and anode; and (d) a nonaqueous conductive liquid electrolyte which comprises a solution of aluminum chloride and at least one lithium salt in sulfur dioxide, a method for improving the cell cycle-life which comprises incorporating an additive in said electrolyte which is effective to provide a redox couple in the electrolyte having a potential in the range which is above that of the $SO_2/S_2O_4^{-2}$ couple and below that of the $Cl_2/Cl^-$ couple.

A further embodiment of the invention is an electrochemical cell comprising in combination: (a) an anode which is comprised of lithium; (b) a cathode; (c) an organic electrode separator; and (d) a nonaqueous conductive liquid electrolyte which comprises a solution in liquid sulfur dioxide of aluminum chloride, at least one lithium salt and at least one additive which is effective to provide a redox couple in the electrolyte having a potential in the range which is above that of the $SO_2/S_2O_4^{-2}$ couple and below that of the $Cl_2/Cl^-$ couple, wherein said lithium salt does not provide a redox couple in the electrolyte having a potential in said range.

An object of the invention is to provide an improved rechargeable lithium-sulfur dioxide electrochemical cell.

Another object of the invention is to provide an improved electrolyte for use in rechargeable lithium-sulfur dioxide cells.

Another object of the invention is to provide an electrolyte additive for rechargeable lithium-sulfur dioxide cells which will improve cell cycle-life.

A further object of the invention is to provide a method for improving the stability of conventional organic electrode separators in rechargeable lithium-sulfur dioxide cells wherein aluminum chloride is an electrolyte component.

DETAILED DESCRIPTION OF THE INVENTION

The presence of chemically uncombined aluminum chloride in the electrolyte of a rechargeable lithium-sulfur dioxide electrochemical cell serves to improve both the discharge capacity and cycling characteristics of the cell. However, we have found that when conventional organic electrode separators are used in such an electrolyte, the cell cycle-life is relatively poor as a consequence of separator decomposition. Although the subject invention is not to be so limited, it is believed that this decomposition is the result of attack by elemental chlorine which is formed by oxidation of chloride ions during recharge of the discharged cell in accordance with the following equation:

The redox potential for this reaction in the electrolyte of this invention, depending on the precise electrolyte composition, is typically in the range from about 4.1 to about 4.4 V with respect to the $Li/Li^+$ couple.

We have found that the above-described undesirable decomposition of organic electrode separators can be reduced or prevented by incorporating an additive into the electrolyte which is effective to provide a redox couple in the electrolyte having a potential in the range which is above that of the $SO_2/S_2O_4^{-2}$ couple and below that of the $Cl_2Cl^-$ couple. Within this broad range, a desired range of redox potentials for the redox couple of the additive is from about 3.1 to about 4.2 V, preferably from about 3.2 to about 4.1 V, and more preferably from about 3.3 to about 4.0 V with respect to the $Li/Li^+$ couple in the electrolyte of this invention. Although the invention is not to be so limited, it is believed that the additive effectively serves to limit the charging voltage which is required to charge the cell to a value below that which results in the formation of chlorine. It is also believed that the additive simultaneously participates in the oxidation of $S_2O_4^{-2}$, the cell discharge product, when the discharged cell is recharged and thereby improves the efficiency of this process. It is further believed that this improved efficiency is specific to the aluminum chloride containing electrolyte of this invention and is related to the substantial solubility of the discharge product in this electrolyte.

Suitable additives for use in the practice of this invention include materials which are soluble in the electrolyte and are effective to provide a redox couple having a potential in the range which is above that of the $SO_2/S_2O_4^{-2}$ couple and below that of the $Cl_2/Cl^-$ couple. That is to say, the additive must have a redox potential which is below that required for $Cl_2$ evolution and above that which is required for $SO_2$ reduction. In addition, suitable additives must be compatible with the various other components of the electrochemical cell in which they are used.

The suitability of a material for use as an additive in the practice of this invention can be easily determined by cyclic voltammetry. As is well known, cyclic voltammetry is an electrochemical technique which involves measuring current as a function of voltage while a linearly changing potential (from limit $V_1$ to limit $V_2$ and then back to $V_1$) is applied to an electrode in contact with an electro-oxidizable or electro-reducible material in a suitable medium. Cyclic voltammetry is described, for example, at pages 178–228 of *Instrumental Methods in Electrochemistry*, T. J. Kemp, Ed., Ellis Horwood Limited, Chichester, England, 1985 and at pages 115–127 of *Organic Electrochemistry*, M. M. Baizer, Ed., Marcel Dekker, Inc., New York, N.Y., 1973. In using this technique to evaluate additives for use in the practice of this invention, the medium will be the electrolyte of this invention, and a lithium electrode will be used as a counter-electrode in combination with a working electrode which can be comprised, for example, of plantinum or glassy carbon.

A series of additives which are particularly preferred for use in the practice of this invention are tabulated below in Table I together with a specific electrolyte composition and the redox potential of the additive as measured by cyclic voltammetry in the stated electrolyte against a lithium electrode.

TABLE 1

| Additive[a] | Electrolyte[b] | Redox Potential, Volts[h] |
|---|---|---|
| Lithium Closoborane ($Li_2B_{10}Cl_{10}$) | A | 3.71 |
| Thianthrene | A | 3.91 |
| " | B | 3.32 |
| " | C | 4.05 |
| " | D | 3.90 |
| " | E | 3.31 |
| Fe(1,10-phenanthroline)$_2$(CN)$_2$ | A | 3.54 |
| N—Methylphenothiazine | A | 3.44 |
| " | C | 3.60 |
| Fe(1,10-phenanthroline)$_3$Cl$_2$ | E | 3.27 |

[a] The additive concentration in the electrolyte was between 0.05 and 0.17 molar in each case.
[b] The compositions of electrolytes A–E are set forth in footnotes c–g, respectively.
[c] Electrolyte A is a solution of $AlCl_3$ (2.6 M) and $LiAlCl_4$ (1.0 M) in a 10:90 mixture by weight of propylene carbonate and $SO_2$.
[d] Electrolyte B is a solution of $AlCl_3$ (1.1 M) and $LiAlCl_4$ (2.5 M) in a 10:90 mixture by weight of propylene carbonate and $SO_2$.
[e] Electrolyte C is a solution of $AlCl_3$ (2.6 M) and $LiAlCl_4$ (1.0 M) in a 17:83 mixture by weight of propylene carbonate and $SO_2$.
[f] Electrolyte D is a solution of $AlCl_3$ (2.6 M) and $LiAlCl_4$ (1.0 M) in a 5:95 mixture by weight of ethylene carbonate and $SO_2$.
[g] Electrolyte E is a solution of $AlCl_3$ (1.1 M) and $LiAlCl_4$ (2.5 M) in a 5:95 mixture of ethylene carbonate and $SO_2$.
[h] The redox potential for the additive is measured with respect to a $Li/Li^+$ reference electrode and is defined as equal to the average of the anodic and cathodic peak voltages as determined by cyclic voltammetry.

From the data which are set forth in Table I for thianthrene and N-methylphenothiazine, it will be seen that the redox potential of a typical additive will vary as the electrolyte composition is varied. More specifically, it will be noted that the redox potentials of thianthrene are a function of lithium salt concentration, aluminum chloride concentration, and concentration of the polar organic compound used as a cosolvent.

By way of example, the beneficial activity of lithium closoborane as an additive in the practice of this invention is believed to result from the ability of the $B_{10}Cl_{10}^{-2}$ ion to form the following reversible redox couple:

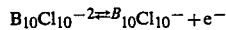

$$B_{10}Cl_{10}^{-2} \rightleftharpoons B_{10}Cl_{10}^{-} + e^{-}$$

It is believed that the resulting $B_{10}Cl_{10}^-$ ion then acts to regenerate cell capacity by the homogeneous oxidation of the cell discharge product. This process can be carried out at a potential of about 3.7 V with respect to the $LI/Li^+$ couple. Such a potential is below the usual end-of-charge voltage for a conventional lithium-sulfur dioxide electrochemical cell which comprises aluminum chloride as an electrolyte component. In the absence of such a redox couple, it is believed that chlorine ($Cl_2$) is evolved as an undesired by-product at conventional end-of-charge voltages.

The electrolyte additive of this invention is used in an amount which is effective to increase cell cycle-life. The amount of additive will typically be enough to yield a concentration in the electrolyte which is in the range from about 0.0001 to about 1.0 molar. A preferred concentration of additive in the electrolyte is in the range from about 0.001 to about 0.5 molar and more preferably in the range from about 0.01 to about 0.3 molar.

The additive of this invention serves to improve the stability of all conventional organic electrode separators which are subject to degradation upon exposure to recharge conditions in a rechargeable lithium-sulfur dioxide cell which contains the additive-free electrolyte of this invention. Such electrode separators include, but are not limited to, separators which are comprised of a material selected from the group consisting of polyolefins and copolymers of olefins with substituted olefins. The additive of this invention is particularly useful for improving the stability of electrode separators which are comprised of a material selected from the group consisting of polyethylene and polypropylene.

The electrolyte additive of this invention is incorporated into a nonaqueous conductive liquid electrolyte which comprises a solution of aluminum chloride and at least one lithium salt in sulfur dioxide.

The aluminum chloride of the electrolyte can, of course, be solvated by the electrolyte solvent or solvents. However, it is otherwise chemically uncombined and refers to that aluminum chloride which is in excess of any that may react chemically with any other materials that are used in preparation of the electrolyte or are introduced into the electrolyte. For example, lithium chloride (LiCl) reacts with aluminum chloride ($AlCl_3$) to yield lithium tetrachloroaluminate ($LiAlCl_4$), a lithium salt. With reference to an electrolyte prepared by dissolving lithium chloride and aluminum chloride in a suitable solvent system, the aluminum chloride of this invention refers to that material which is in excess of the amount consumed by chemical reaction with the lithium chloride.

In addition to aluminum chloride, the electrolyte used in the practice of this invention comprises at least one lithium salt. It will be appreciated, of course, that this lithium salt is in addition to and different from any lithium salt, such as lithium closoborane, that may be used as the additive in the practice of this invention. The lithium salt serves to improve the conductivity of the electrolyte. In addition, a high lithium cation ($Li^+$) concentration in the electrolyte is highly desirable since this is believed to promote the formation of a passivating film of lithium dithionite on the lithium anode. Further, this lithium salt serves as a source of lithium for electrodeposition.

Suitable lithium salts for use in the practice of this invention include all lithium salts, other than the additive, which are soluble in the electrolyte system. For example, the electrolyte of this invention can be prepared by combining a lithium salt such as lithium chloride, lithium dithionite or lithium trifluoromethanesulfonate with aluminum chloride in a suitable solvent system. However, some lithium salts, like lithium chloride, can undergo chemical reaction with a portion of the aluminum chloride to yield one or more new lithium salts in solution. Accordingly, the lithium salt required for the practice of this invention can be any ionic material, other than the additive, which is comprised of lithium cations.

The aluminum chloride content of the electrolyte can range from about 0.01 molar up to the amount required for saturation of the electrolyte. Preferably, however, the amount of aluminum chloride is in the range from about 0.1 molar up to the amount required for saturation of the electrolyte, and more preferably in the range from about 0.1 to about 6 molar. The ratio of moles of aluminum chloride to equivalents of lithium cation ($Li^+$) in the electrolyte is desirably in the range from about 0.001 to about 100, preferably from about 0.01 to about 50, and more preferably from about 0.1 to about 30.

The electrolyte for use in the electrochemical cell of this invention comprises sulfur dioxide which is electrochemically reduced during discharge of the electrochemical cell. This sulfur dioxide also functions as a solvent for the lithium salt, additive and chemically uncombined aluminum chloride which are required in the practice of this invention. The sulfur dioxide is stable when in contact with the lithium electrode. Although the reasons for this are not well understood, it is believed that the anode is passivated by the formation of a thin film of lithium dithionite ($Li_2S_2O_4$) which then prevents self-discharge. Nevertheless, this thin film permits electrochemical oxidation and reduction to take place at the lithium anode during operation of the cell by passage of lithium cations through the film.

As stated above, the sulfur dioxide component of the electrolyte of this invention functions as a solvent for the other electrolyte components. Accordingly, the mole ratio of sulfur dioxide to aluminum chloride is at least about 1.05, preferably from about 1.5 to about 200, and more preferably from about 2.0 to about 175.

If desired, the electrolyte for use in the electrochemical cell of this invention can additionally comprise one or more dissolved electrolyte salts other than the required lithium salt and chemically uncombined aluminum chloride (and additive in those cases where the additive is a salt). Such additional lithium-free electrolyte salts are ordinarily selected and utilized in amounts which are effective to provide an improved conductivity for efficient operation of the electrochemical cell. Suitable additional electrolyte salts include, but are not limited to, salts containing metal cation complexes, quaternary ammonium salts, phosphonium salts, pyridinium salts and arsonium salts.

In addition to sulfur dioxide, aluminum chloride, lithium salt and additive, the electrolyte for use in the electrochemical cell of this invention can additionally comprise one or more polar organic compounds which are substantially inert to the other electrolyte components and to lithium metal. Such organic compounds lack acidic hydrogen atoms and contain one or more atoms having at least one unshared pair of electrons. For the purposes hereof, "acidic hydrogen atoms" are those hydrogen atoms which are capable of being readily abstracted by lithium metal. However, strongly basic organic compounds such as amines are not generally desirable.

The use of a polar organic compound as an additional electrolyte component represents a highly preferred embodiment of the invention since the presence of this organic material typically results in a further improvement in the discharge capacity of the cell. Although the reason for this effect by the polar organic compound is unknown, it is believed that the effect may be related to an enhancement of aluminum chloride ionization in the electrolyte by the organic compound.

Suitable polar organic compounds are typically liquids but can also be solids which are soluble in sulfur dioxide, such as ethylene carbonate (mp 40° C.) and sulfolane (mp 27° C.). These organic compounds contain at least one element which is selected from Groups 3a, 4a, 5a and 6a of the Periodic Table (*Handbook of Chemistry and Physics*, 57th ed., 1976–77, p. B-4). Preferred elements from this group include, for example, boron, silicon, nitrogen, phosphorus, oxygen and sulfur as well as combinations of these elements.

Suitable polar organic compounds for use in the practice of this invention include, but are not limited to, trialkyl borates, boronic acid esters, borinic acid esters, tetraalkyl silicates, alkylalkoxyl silanes, nitroalkanes, alkyl nitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethyoxypropane, 1,3-dioxolane, ethyl acetate, trimethyl orthoformate, γ-butyrolactone, dimethyl carbonate, ethylene carbonate, propylene carbonate, tetramethyl orthocarbonate, diethyl ether, tetrahydrofuran, 1,2-dimethoxyethane, acetic anhydride, dimethyl sulfate, dimethyl sulfite, ethylene sulfite and sulfolane (tetramethylene sulfone).

Preferred polar organic compounds for use in the practice of this invention include alkyl nitriles, dialkyl amides, lactams, monocarboxylic acid esters, ortho esters, lactones, dialkyl carbonates, alkylene carbonates, orthocarbonates, monoethers and polyethers. Highly preferred polar organic compounds have a Donor Number in the range from about 10 to about 25, where Donor Number is defined as the molar enthalpy for the reaction of a given polar organic compound with $SbCl_5$ as a reference electron acceptor in a 0.001 molar solution in 1,2-dichloroethane (for a discussion of Donor Number and a tabulation of Donor Numbers for various solvents, see *Lithium Batteries*, Jean-Paul Gabano, Ed., Academic Press, 1983, pp 17 and 18). Specific polar organic compounds which have been found to be highly satisfactory for use in the practice of this invention include propylene carbonate, ethylene carbonate, 1,2-dimethoxyethane, 1,3-dioxolane, acetonitrile and γ-butyrolactone.

When a polar organic compound is used as an electrolyte component in the practice of this invention, the electrolyte desirably comprises a mixture of sulfur dioxide and at least one polar organic compound, wherein the amount of sulfur dioxide is in the range from about 20 to about 99.9 percent by weight based on the combined weight of polar organic compound and sulfur dioxide. More preferably, the amount of sulfur dioxide is in the range from about 60 to about 99 percent by weight based on the combined weight of polar organic compound and sulfur dioxide.

In the practice of this invention, it will be appreciated that the lithium salt or salts utilized in the electrolyte and any polar organic compound utilized as an electrolyte component are different from the additive of this invention in that they do not provide a redox couple in the electrolyte which has a potential in the range which is above that of the $SO_2/S_2O_4^{-2}$ couple and below that of the $Cl_2/Cl^-$ couple.

The anode used in the electrochemical cell of this invention can be constructed from either substantially pure lithium or a lithium alloy. Suitable lithium alloys for this purpose include, but are not limited to, lithium-aluminum, lithium-silicon and lithium-Wood's metal alloys.

The cathode of the electrochemical cell can be constructed of any material which is electrically conducting and is substantially inert to the electrolyte system. In addition, the cathode material is desirably catalytic with respect to electroreduction of the cathode depolarizer. Preferred materials include metals of the platinum group family consisting of platinum, iridium, osmium, palladium, rhodium and ruthenium; carbon in any of its common electrode forms; iron in its various forms, particularly as stainless steel; and metals from the group consisting of titanium, nickel, silver, mercury, lead and gold. Less preferred materials are metals of the families of vanadium, chromium and manganese [Groups 5b, 6b and 7b of the Periodic Table of Elements (*Handbook of Chemistry and Physics*, 57th ed., 1976–77, p. B-4)]; metals from the group consisting of zirconium, cobalt, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like. Highly preferred cathode materials include graphite or carbon which is bonded to an electrically conducting metal screen.

The following examples are intended only to illustrate the invention and are not to be construed as imposing limitations on it. The lithium tetrachloroaluminate (LiAlCl$_4$) referred to in these examples was, in each case, prepared by the in situ reaction between lithium chloride (LiCl) and aluminum chloride (AlCl$_3$).

EXAMPLE I

A rechargeable electrochemical cell enclosed in a glass container (cylindrical in shape having a diameter of about 2.5 cm) was prepared which contained an electrode pack which was prepared by sandwiching a porous polyethylene electrode separator between a lithium foil anode (15×1.3×0.038 cm) and a flexible carbon cathode current collector (13×1.3×0.056 cm) and rolling the resulting sandwich structure into a roll. The cell also contained, as an electrolyte, 6.7 cm$^3$ of a solution of aluminum chloride (AlCl$_3$), lithium tetrachloroaluminate (LiAlCl$_4$) and lithium closoborane (Li$_2$B$_{10}$Cl$_{10}$) in an 18:82 mixture by weight of propylene carbonate and liquid sulfur dioxide which was 2.5 molar in AlCl$_3$, 0.9 molar in LiAlCl$_4$ and 0.25 molar in Li$_2$B$_{10}$Cl$_{10}$. The cathode current collector was prepared by attaching a mixture of 85 weight percent acetylene black (Gulf Shawinigan Black) and 15 weight percent of Teflon binder to a stainless steel mesh support. The polyethylene electrode separator was a double layer of HIPORE A obtained from Asahi Kasei Co. which had a thickness of 200 microns, a porosity of 67% and a maximum pore size of 0.3 micron. The resulting cell was subjected to a series of charge/discharge cycles with an 80% depth-of-discharge on each cycle. The cell completed 161 cycles before cycling was terminated because of reduced cell capacity. The cell had an initial capacity of 0.275 Ahr (to 2.0 V) and had a final capacity at the end of 161 cycles of 0.125 Ahr (to 2.1 V). The initial end-of-charge voltage (EOCV) was 3.70 V at 15 ma and the final EOCV at the end of 161 cycles was 3.80 V at 10–15 ma. The cell was subsequently opened for inspection and the polyethylene electrode separator was found to be very flexible and free of cracks. In comparison, in cells which do not contain Li$_2$B$_{10}$Cl$_{10}$ but are otherwise substantially identical, the electrode separator has been found to be embrittled and badly cracked after fewer than 40 such cycles (see Comparison Example B below).

EXAMPLE II

A rechargeable electrochemical cell was prepared as described in Example I except that: (a) the cell was enclosed in a standard-size, sealed, stainless steel C$_s$ casing (cylindrical in shape having a height of about 3.8 cm and a diameter of about 2.2 cm); and (b) the electrolyte was 4.0 cm$^3$ of a solution of aluminum chloride (AlCl$_3$), lithium tetrachloroaluminate (LiAlCl$_4$) and lithium closoborane (Li$_2$B$_{10}$Cl$_{10}$) in an 18:82 mixture by weight of propylene carbonate and liquid sulfur dioxide which was 2.3 molar in AlCl$_3$, 1.0 molar in LiAlCl$_4$ and 0.25 molar in Li$_2$B$_{10}$Cl$_{10}$. The cell was subjected to a series of charge/discharge cycles with an 80% depth-of-discharge on each cycle and completed 144 cycles before failure occurred as a result of internal shorting. The cell had an initial capacity of 0.25 Ahr (to 2.0 V), and end-of-charge voltages were 3.75 V at 15 to 30 ma.

EXAMPLE III

A rechargeable electrochemical cell was prepared as described in Example I except that the cell contained as an electrolyte 4.0 cm$^3$ of a solution of aluminum chloride (AlCl$_3$), lithium tetrachloraluminate (LiAlCl$_4$) and lithium closoborane (Li$_2$B$_{10}$Cl$_{10}$) in a 17:83 mixture by weight of propylene carbonate and liquid sulfur dioxide which was 2.6 molar in AlCl$_3$, 1.0 molar in LiAlCl$_4$ and 0.10 molar in Li$_2$B$_{10}$Cl$_{10}$. The cell was subjected to a series of charge/discharge cycles with an 80% depth-of-discharge on each cycle and completed 112 cycles before cycling was terminated because of reduced cell capacity. The cell capacity was initially 0.30 Ahr (to 2.0 V) and 0.125 Ahr (to 2.0 V) after 112 cycles. Comparison of these results with those of Example I demonstrates that an increase in cell capacity of about 25–30% can be obtained by decreasing the Li$_2$B$_{10}$Cl$_{10}$ concentration from 0.25 molar to 0.10 molar. This increase in cell capacity at the lower Li$_2$B$_{10}$Cl$_{10}$ concentration is believed to be a result of better wetting of the electrode separator by the electrolyte at the lower additive concentration.

EXAMPLE IV

A rechargeable electrochemical cell was prepared as described in Example III except that the polyethylene electrode separator was a single layer of HIPORE A which had a thickness of 100 microns. The cell was subjected to a series of charge/discharge cycles with an 80% depth-of-discharge on each cycle and completed 74 cycles before cell failure occurred as a result of internal shorting. The cell capacity was initially 0.30 Ahr (to 2.0 V) and 0.18 Ahr (to 2.9 V) after 50 cycles. End-of-charge voltages were 3.75 V at 15 ma.

EXAMPLE V

A rechargeable electrochemical cell was prepared as described in Example I except that the cell contained as an electrolyte 4.0 cm$^3$ of a solution of aluminum chloride (AlCl$_3$), lithium tetrachloroaluminate (LiAlCl$_4$) and lithium closoborane (Li$_2$B$_{10}$Cl$_{10}$) in a 17:83 mixture by weight of propylene carbonate and liquid sulfur dioxide which was 2.5 molar in AlCl$_3$, 1.0 molar in LiAlCl$_4$ and 0.05 molar in Li$_2$B$_{10}$Cl$_{10}$. The cell was subjected to a series of charge/discharge cycles with an 80% depth-of-discharge on each cycle and completed 145 cycles before cycling was terminated because of reduced cell capacity. The cell capacity was initially 0.30 Ahr (to 2.0 V) and 0.125 Ahr (to 2.0 V) after 145 cycles. The end-of-charge voltage was 3.75 V at 10-15 ma over the first 40 cycles.

EXAMPLE VI

A rechargeable electrochemical cell was prepared as described in Example I except that the cell contained as an electrolyte 4.2 cm$^3$ of a solution of aluminum chloride ($AlCl_3$), lithium tetrachloroaluminate ($LiAlCl_4$) and lithium closoborane ($Li_2B_{10}Cl_{10}$) in a 20:80 mixture by weight of propylene carbonate and liquid sulfur dioxide which was 2.6 molar in $AlCl_3$, 1.0 molar in $LiAlCl_4$ and 0.4 molar in $Li_2B_{10}Cl_{10}$. The cell capacity was initially 0.03 Ahr (to 2.1 V), which is quite low compared with the cells described in Examples I-V which utilized lower concentrations of $Li_2B_{10}Cl_{10}$. In addition, there was a visible lack of electrode separator wetting by the electrolyte.

EXAMPLE VII

A rechargeable electrochemical cell was prepared as described in Example I except that: (a) the polyethylene electrode separator was a single layer of HIPORE A which had a thickness of 100 microns; (b) the cell was enclosed in a standard-size, sealed, stainless steel $C_s$ casing (cylindrical in shape having a height of about 3.8 cm and a diameter of about 2.2 cm); and (c) the electrolyte was 3.9 cm$^3$ of a solution of aluminum chloride ($AlCl_3$), lithium tetrachloroaluminate ($LiAlCl_4$) and lithium closoborane ($Li_2B_{10}Cl_{10}$) in a 20:80 mixture by weight of propylene carbonate and liquid sulfur dioxide which was 2.6 molar in $AlCl_3$, 1.0 molar in $LiAlCl_4$ and 0.10 molar in $Li_2B_{10}Cl_{10}$. The cell was subjected to a series of charge/discharge cycles with an 80% depth-of-discharge on each cycle and completed 55 cycles before cell failure occurred as a result of internal shorting. The cell capacity was initially 0.275 Ahr (to 2.0 V) and 0.125 Ahr (to 2.9 V) after 55 cycles. The end-of-charge voltage was 3.75 V at 30 ma over the first 45 cycles.

EXAMPLE VIII

A rechargeable electrochemical cell was prepared as described in Example I except that the cell contained as an electrolyte 4.0 cm$^3$ of a solution of aluminum chloride ($AlCl_3$), lithium tetrachloroaluminate ($LiAlCl_4$) and N-methylphenothiazine in a 17:83 mixture by weight of propylene carbonate and liquid sulfur dioxide which was 2.7 molar in $AlCl_3$, 1.0 molar in $LiAlCl_4$ and 0.14 molar in N-methylphenothiazine. The cell was subjected to a series of charge/discharge cycles with an 80% depth-of-discharge on each cycle and completed 51 cycles before cycling was terminated. The cell capacity was initially 0.29 Ahr (to 2.0 V) or 0.24 Ahr (to 2.9 V) and 0.125 Ahr (to 2.5 V) after 50 cycles. Most of each charging curve (voltage as a function of time during charge) was 3.55 V at 30 ma compared to 3.75-3.80 V at 30 ma for a cell which does not contain methylphenothiazine but is otherwise substantially identical (see Comparison Example A). End-of-charge voltages were less than 3.8 V at 30 ma.

EXAMPLE IX

A rechargeable electrochemical cell was prepared as described in Example I except that the cell contained as an electrolyte 4.0 cm$^3$ of a solution of aluminum chloride ($AlCl_3$), lithium tetrachloroaluminate ($LiAlCl_4$) and thianthrene in a 17:83 mixture by weight of propylene carbonate and liquid sulfur dioxide which was 2.7 molar in $AlCl_3$, 1.0 molar in $LiAlCl_4$ and 0.15 molar in thianthrene. The cell was subjected to a series of charge/discharge cycles with an 80% depth-of-discharge on each cycle and completed 150 cycles before cycling was terminated because of reduced cell capacity. The cell capacity was initially 0.28 Ahr (to 2.0 V) or 0.24 Ahr (to 2.9 V) and 0.125 Ahr (to 2.0 V) after 150 cycles. The center portion of each charging curve (voltage as a function of time during charge) was 3.75 V at 30 ma compared to 3.75-3.80 V at 30 ma for a cell which does not contain thianthrene but is otherwise substantially identical (see Comparison Example A). The charging curves (voltage as a function of time during charge) for the first few charges resemble those for the cell of Comparison Example A in that a taper down to 5 ma was required in order to complete the charge at a voltage below 3.9 V. However, unlike the cell of Comparison Example A which contained no thianthrene, the need to taper the charging current below 30 ma rapidly disappeared (See Table II).

TABLE II

| Charge/Discharge Cycle | % of Full Charge Achieved before Tapering the Charging Current below 30 ma* |
|---|---|
| 1 | 75 |
| 2 | 85 |
| 5 | 93 |
| 6 | 95 |
| 7 | 97 |
| 9 | 99 |
| 10 | 100 |

*Full charge is defined as the charge delivered in the prior cycle upon discarge to 2.9 V.

EXAMPLE X

A rechargeable electrochemical cell was prepared as described in Example I except that: (a) an aluminum mesh was used in place of stainless steel mesh in preparation of the cathode current collector; and (b) the electrolyte was 4.0 cm$^3$ of a solution of aluminum chloride ($AlCl_3$), lithium tetrchloroaluminate ($LiAlCl_4$) and $Fe(1,10\text{-phenanthroline})_2(CN)_2$ in a 10:90 mixture by weight of propylene carbonate and liquid sulfur dioxide which was 2.49 molar in $AlCl_3$, 1.01 molar in $LiAlCl_4$ and 0.10 molar in $Fe(1,10\text{-phenanthroline})_2(CN)_2$. The cell was subjected to a series of charge/discharge cycles with an 80% depth-of-discharge on each cycle and completed 161 cycles. The cell capacity was initially 0.18 Ahr (to 2.9 V) and 0.125 Ahr (to 2.1 V) in cycle 161. The end-of-charge voltage in cycle 6 was 3.85 V at 7.5 ma.

COMPARISON EXAMPLES

A. Li-$SO_2$ Cell without Electrolyte Additive.- A rechargeable electrochemical cell was prepared as described in Example I except that the cell contained as an electrolyte 4.0 cm$^3$ of a solution of aluminum chloride ($AlCl_3$) and lithium tetrachloroaluminate ($LiAlCl_4$) in a 17:83 mixture by weight of propylene carbonate and liquid sulfur dioxide which was 2.5 molar in $AlCl_3$ and 1.0 molar in $LiAlCl_4$. The cell was subjected to a series of charge/discharge cycles with an 80% depth-of-discharge on each cycle and completed 70 cycles before cycling was terminated because of reduced cell capacity. The cell capacity was initially 0.23 Ahr (to 2.9 V) and 0.125 Ahr (to 2.1 V) after 70 cycles. The end-ofcharge voltage (EOCV) was maintained at or below 3.85 V but, in order to do this, it was necessary to use a relatively low end-of-charge current (EOCC) of 3 to 4 ma. In comparison, cells such of those of Examples I-V and VII could be subjected to an EOCC of 15 to 30 ma (about 4 to 10 times larger) while maintaining the EOCV at a lower value of 3.75 V. With the cell of this Comparison Example A, it was found that the EOCV and charge levels set forth in Table III were obtained with a 15 ma charging current. In contrast, the cells of Examples I-V and VII were fully charged at an EOCV of 3.70 to 3.75 V and an EOCC of 15 ma.

TABLE III

| End-of-Charge Voltage, V | % of Full Charge Achieved* |
|---|---|
| 3.75 | 57 |
| 3.80 | 90 |
| 3.85 | 94 |

*Full charge is defined as the charge delivered in the prior cycle upon discharge to 2.9 V.

B. Li-$SO_2$ Cell without Electrolyte Additive.- A rechargeable electrochemical cell was prepared as described in Example I except that: (a) the polyethylene electrode separator was a single layer of HIPORE A which had a thickness of 100 microns; and (b) the cell contained as an electrolyte 8.6 $cm^3$ of a solution of aluminum chloride ($AlCl_3$) and lithium tetrachloroaluminate ($LiAlCl_4$) in a 10:90 mixture by weight of propylene carbonate and liquid sulfur dioxide which was 2.9 molar in $AlCl_3$ and 1.1 molar in $LiAlCl_4$. The cell was subjected to a series of charge/discharge cycles with an 80% depth-of-discharge on each cycle and completed 35 cycles before cell failure occurred as a result of internal shorting. The cell capacity was initially 0.34 Ahr (to 2.3 V) and 0.29 Ahr (to 2.3 V) in cycle 36. The end-of-charge voltage during the series of cycles ranged from 4.0 to 4.2 V at 30 ma. The electrode separator of the failed cell was inspected and found to be badly cracked and also bonded to the cathode.

C. Li-$SO_2$ Cell with $Li_2B_{12}Cl_{12}$ as an Electrolyte Additive.- A rechargeable electrochemical cell was prepared as described in Comparison Example A except that the electrolyte additionally contained $Li_{12}B_{12}Cl_{12}$ at a 0.10 molar concentration level. The cell was subjected to a series of charge/discharge cycles with an 80% depth of discharge on each cycle and completed 40 cycles before cycling was terminated because of reduced capacity. The cell capacity was initially 0.22 Ahr (to 2.9 V) and 0.125 Ahr (to 2.3 V) after 40 cycles. The behavior of this cell was substantially identical with that of the cell of Comparison Example A. Accordingly, the $Li_2B_{12}Cl_{12}$ additive (which does not provide a redox couple having a potential in the range which is above that of the $SO_2/S_2O_4^{-2}$ couple and below that of the $Cl_2/Cl^-$ couple) was without effect and did not provide the beneficial results which are obtainable through the use of $Li_2B_{10}C_{10}$ and are exemplified in Examples I-V and VII.

D. Li-$SO_2$ Cell with $Li_2B_{10}Cl_{10}$ Additive and Woven Glass Cloth Electrode Separator.- An electrochemical cell was prepared as described in Example I except that: (a) the electrode separator was a woven glass cloth having a thickness of 130 microns (obtained from the Columbia Electrical Tape Mfg. Div. of Mutual Industries); and (b) the cell contained as an electrolyte 4.9 $cm^3$ of a solution of aluminum chloride ($AlCl_3$), lithium tetrachloroaluminate ($LiAlCl_4$) and lithium closoborane ($Li_2B_{10}Cl_{10}$) in a 17:83 mixture by weight of propylene carbonate and liquid sulfur dioxide which was 3.0 molar in $AlCl_3$, 1.0 molar in $LiAlCl_4$ and 0.25 molar in $Li_2B_{10}C_{10}$. When an attempt was made to cycle this cell, shorting occurred on the first attempted charge. Accordingly, the inert open-weave glass separator of this cell was penetrated by lithium dendrites during the first charge. This result demonstrates that the improved results of this invention are not a consequence of the elimination of dendrite formation by the additive. A cell which did not contain $Li_2B_{10}Cl_{10}$ but was otherwise substantially identical with the cell of this Comparison Example D behaved in exactly the same way and shorted on the first attempted charge.

We claim:

1. A nonaqueous conductive liquid which comprises a solution in liquid sulfur dioxide of:
   (a) at least one polar organic compound having a Donor Number in the range from about 10 to about 25;
   (b) aluminum chloride;
   (c) at least one lithium salt; and
   (d) at least one additive which is effective to provide a redox couple in said solution having a potential in the range which is above that of the $SO_2/S_2O_4^{-2}$ couple and below that of the $Cl_2/Cl$ couple, wherein said polar organic compound and lithium salt do not provide a redox coupled in the solution having a potential in said range.

2. The liquid of claim 1 wherein the concentration of said additive in the solution is in the range from about 0.01 to about 0.3 molar.

3. The liquid of claim 1 wherein said additive provides a redox couple having a potential in the range from about 3.2 to about 4.1 V with respect to the $Li/Li^+$ couple.

4. The liquid of claim 1 wherein said additive is selected from the group consisting of N-methylphenothiazine, thianthrene, $Li_2B_{10}Cl_{10}$, $Fe(1,10-phenanthroline)_3Cl_2$ and $Fe(1,10-phenanthroline)_2(CN)_2$.

5. The liquid of claim 1 wherein said polar organic compound is selected from the group consisting of propylene carbonate, ethylene carbonate, 1,2-dimethoxyethane, 1,3-dioxolane, acetonitrile and $\gamma$-butyrolactone.

6. The liquid of claim 1 wherein said solution contains from about 60 to about 99 percent by weight of sulfur dioxide based on the combined weight of polar organic compound and sulfur dioxide.

7. The liquid of claim 1 wherein the concentration of aluminum chloride in said solution is in the range from about 0.1 to about 6 molar.

8. The liquid of claim 1 wherein the ratio of moles of aluminum chloride to equivalents of lithium cation in said solution is in the range from about 0.01 to about 50.

9. The liquid of claim 1 wherein said lithium salt comprises lithium tetrachloroaluminate.

10. An electrochemical cell comprising in combination:
   (a) an anode which is comprised of lithium;
   (b) a cathode;
   (c) an organic electrode separator; and
   (d) a nonaqueous conductive liquid electrolyte which comprises a solution in liquid sulfur dioxide of aluminum chloride, at least one lithium salt, at least one polar organic compound having a Donor Number in the range from about 10 to about 25 and at least one additive which is effective to provide a redox couple in the electrolyte having a potential in the range which is above that of the $SO_2/S_2O_4^{-2}$ couple and below that of the $Cl_2/Cl$ couple, wherein said polar organic compound and said lithium salt do not provide a redox couple in the electrolyte having a potential in said range.

11. The electrochemical cell of claim 10 wherein said organic electrode separator is comprised of a material selected from the group consisting of polyolefins and copolymers of olefins with substituted olefins.

12. The electrochemical cell of claim 10 wherein said organic electrode separator is comprised of polyethylene.

13. The electrochemical cell of claim 10 wherein the concentration of said additive in the solution is in the range from about 0.01 to about 0.3 molar.

14. The electrochemical cell of claim 10 wherein said additive is selected from the group consisting of N-methylphenothiazine, thianthrene, $Li_2B_{10}Cl_{10}$, $Fe(1,10\text{-phenanthroline})_3Cl_2$ and $Fe(1,10\text{-phenanthroline})_2(CN)_2$.

15. The electrochemical cell of claim 10 wherein said polar organic compound is selected from the group consisting of propylene carbonate, ethylene carbonate, 1,2-dimethoxyethane, 1,3-dioxolane, acetonitrile and γ-butyrolactone.

* * * * *

UNITED STATES PATENT OFFICE
CERTIFICATE OF CORRECTION

Patent No. 4,869,977       Dated  September 26, 1989

Inventor(s)  John F. Connolly, Robert J. Thrash and Bruce D. Webber

It is certified that error appears in the above-identified patent and that said Letters Patent is hereby corrected as shown below:

Column 4, line 20, "Cl$_2$Cl$^-$" should read --Cl$_2$/Cl$^-$--.

Column 5, line 2, "plantinum" should read --platinum--.

Column 5, line 49, "$B_{10}Cl_{10}^{-2} \rightleftarrows B_{10}Cl_{10}^{-}+e^-$" should read --$B_{10}Cl_{10}^{-2} \rightleftarrows B_{10}Cl_{10}^{-}+e^-$--.

Column 5, line 55, "LI/Li$^+$" should read --Li/Li$^+$--.

Column 12, line 33, "discarge" should read --discharge--.

Column 12, line 43, "tetrchloroaluminate" should read --tetrachloroaluminate--.

Column 14, line 26, "Cl$_2$/Cl" should read --Cl$_2$/Cl$^-$--.

Column 15, line 3, "Cl$_2$/Cl" should read --Cl$_2$/Cl$^-$--.

Signed and Sealed this

First Day of December, 1992

Attest:

DOUGLAS B. COMER

Attesting Officer       Acting Commissioner of Patents and Trademarks